3,519,447
CERAMIC REFRACTORY
Edward F. Adams, Corning, and George D. McTaggart and Emmerson K. Norman, Horseheads, N.Y., assignors, by mesne assignments, to Corhart Refractories Company, a corporation of Delaware
Filed Aug. 21, 1967, Ser. No. 661,999
Int. Cl. C04b 35/48
U.S. Cl. 106—57　　　　　　　　　　　　　　　5 Claims

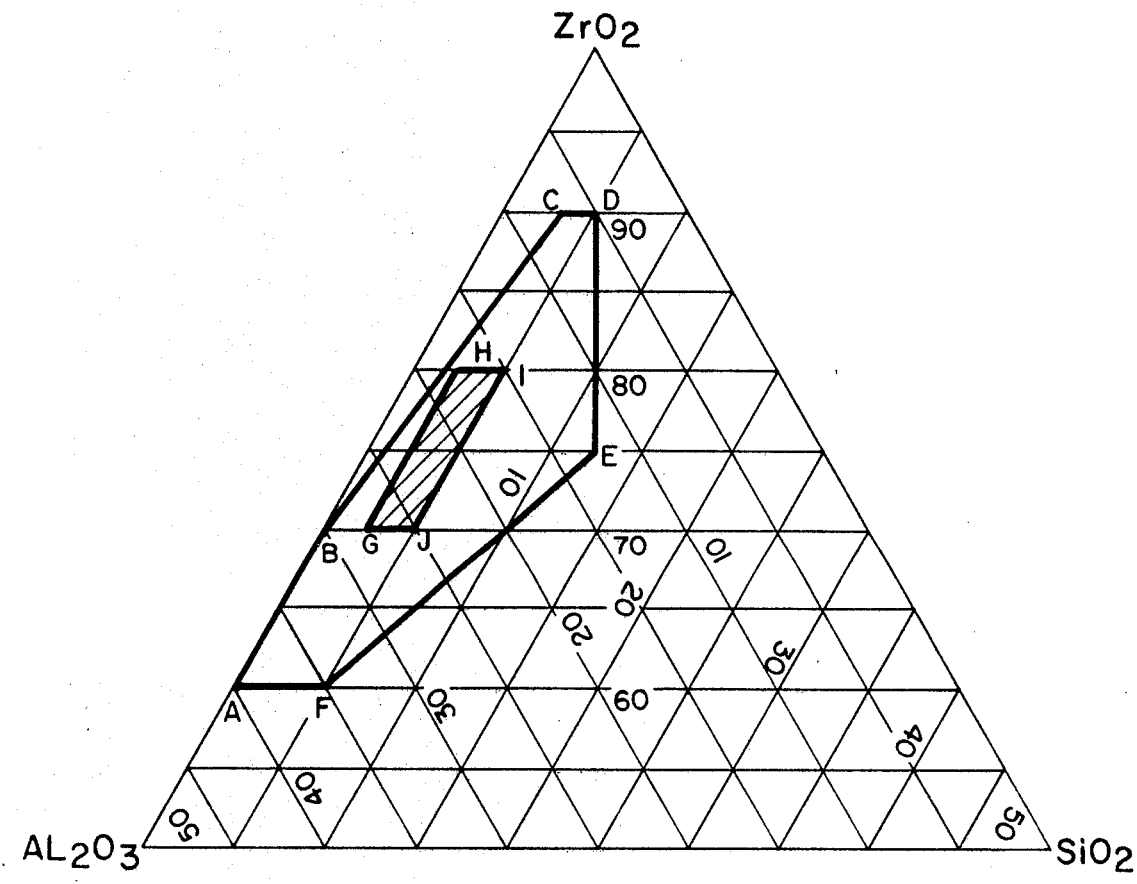

ABSTRACT OF THE DISCLOSURE

Shaped sintered refractory ceramic bodies of zirconia-alumina-silica are described. Zirconia constitutes from 60 to 90% by weight of the sintered products. The zirconia is not stabilized. Nevertheless, and despite the high zirconia content, substantially crack-free sintered bodies of practical size for use in glass-melting tanks are produced. These refractory bodies are resistant to corrosion by molten glass at high use temperatures and exhibit low stoning potential. A schedule for the successful firing of green bodies of the compositions is disclosed.

CROSS-REFERENCE TO RELATED APPLICATION

Copending application, Ser. No. 662,018 filed on even date herewith, by Edward F. Adams, discloses and claims the method of producing substantially crack-free, shaped, sintered refractory bodies from the herein described compositions.

BACKGROUND OF THE INVENTION

The problem of providing satisfactory refractory materials for use in contact with molten glasses, particularly as lining in glass melting furnaces, has been rendered more and more difficult by the present tendency in the industry to resort to increasingly higher furnace temperatures. Raising the temperature of the glass melt obviously enhances its corrosivity to the furnace lining. This generally leads to the development of stones in the glass. Furthermore, blistering tends to manifest itself at highly elevated temperatures. Accordingly, the employment of higher furnace temperatures renders more difficult the attaining of specified quality in the glass produced.

Certain materials, such as chromic oxide and tin oxide reasonably satisfactorily meet severe temperature requirements but special care must be exercised to avoid sublimation of the refractory and discoloration of the glass.

Certain available zirconia-alumina-silica refractories, which typically contain from 30 to 40 percent by weight of zirconia, have been employed with some success but, at temperatures above about 1500° C., they react readily with many glasses.

In shaped, sintered zirconia-alumina-silica refractory bodies a relatively high content of zirconia is desired because of the ability of this material to enable such bodies to meet the requirements of the higher use temperatures desired. Furthermore, the alumina of such a refractory body slowly dissolves in the molten glass, particularly at high use temperature. Accordingly, if the alumina content is raised at the expense of the zirconia content, the refractory body tends to exhibit a high stoning potential. In addition, the gradual dissolving of the alumina by the molten glass adversely affects the microstructure of the refractory body which in turn may lead to dimensional changes and early failure in use.

However, the inclusion of a significant quantity of zirconia in a sintered refractory body presents practical difficulties. As is well known, zirconia changes from a monoclinic phase to a tetragonal phase when it is heated above a temperature of approximately 1100° C. The monoclinic phase reforms as the material cools. During this cooling-induced reversion to the monoclinic phase, a volume increase of the zirconia of about 9% occurs. This volume increase occurs within a narrow temperature range and is sufficient to cause fracturing or cracking of the refractory body containing a significant amount of zirconia.

It is known, of course, that a degree of control of this phase inversion of zirconia may be obtained by the addition of other oxides, particularly to the zirconia-containing refractory body. These oxides cause the zirconia to assume a cubic form at high temperatures, which form is retained during cooling. However, when this so-called "stabilized zirconia" is subjected to cyclic heating and cooling, it gradually reverts to the monoclinic phase. This reversion also takes place when a refractory body containing stabilized zirconia is in prolonged contact with molten glass. Furthermore, in compositions containing alumina in addition to stabilized zirconia reaction will occur between the alumina and the stabilizing oxide. With calcium oxide alumina forms calcium hexaluminate; with magnesium oxide the reaction produces magnesium aluminate spinel. Both of these reaction products have an extremely low resistance to corrosion by soda lime glass and hence refractory bodies containing alumina and zirconia so stabilized fail somewhat rapidly in service.

SUMMARY OF THE INVENTION

The present invention provides compositions of zirconia, alumina and silica which, despite the large amount of zirconia contained therein, may be fired without cracking being induced by the above described change of phase of the zirconia to give a sintered, substantially crack-free refractory body that is highly resistant to the corrosive action of molten glass, has a low stoning potential and is thermally stable. In other words, while ordinarily the refractory body will be in continuous service, it will not be unduly adversely affected, as by cracking or spalling, on furnace shut-down and subsequent reheating.

The compositions of the invention have a zirconia content which may be from about 60 to about 90 percent by weight. These compositions, which will be more specifically hereinafter defined, may additionally contain only alumina, or they may contain both alumina and silica.

The alumina present in the composition is principally and desirably in the form of corundum although generally the final refractory body will contain a small amount of alumina combined with silica in the form of mullite.

It will, of course, be understood that ordinary commercial grades of zirconia and alumina will contain impurities such as silica, oxides of iron, titania, calcium oxide, magnesia and the like. Within certain limits, to be hereinafter defined, these impurities may be tolerated and, in fact, may be considered desirable. For example, the silica that is contained in the refractory bodies of the invention may be derived, in whole or in part, from the zirconia and alumina employed, inasmuch as silica is generally naturally associated with both of these materials. Ferric oxide and titania, in small amounts, are also frequently contaminants of zirconia and alumina. These materials are known to be mineralizers, or sintering aids, which generally are effective to permit the use of lower firing temperatures during sintering. Thus, while it is possible to prepare a refractory body according to the present invention from a composition consisting of essentially pure zirconium oxide and aluminum oxide or from such compositions containing additionally a small amount of silica, it is not necessary or economically feasible to do so.

As illustrative of the commercial raw materials mentioned in the preceeding paragraph, it should be noted that a representative fused zirconia grain corresponds to the following analysis: $ZrO_2$, 83.90%; $Al_2O_3$, 10.68%; $SiO_2$, 4.52%; CaO, 0.68%; $Fe_2O_3$, 0.16%; $TiO_2$, 0.04%. Similarly, Demerara bauxite, a representative source of alumina for use in producing the refractory bodies of the present invention, typically has the following composition: $Al_2O_3$, 89.46%; $SiO_2$, 6.02%; $TiO_2$, 2.98%; $Fe_2O_3$, 1.53%; ZrO, 0.82%; MgO, 0.13%; CaO, 0.06%. In each of the above analyses, the percentages given are on a weight basis. Unless otherwise specified, throughout this specification, all parts and percentages are on a weight basis.

It will be understood, of course, that in using raw materials such as those described above, due allowance will be made, for example, for the presence in the zirconia source of a significant amount of alumina. Therefore, to provide a composition containing 80% zirconia, it would be necessary to employ 95.4 parts of the described fused zirconia grain per hundred parts of final composition. This would supply 10.2 parts of alumina, which fact would have a bearing on the amount of alumina source to be added and on the composition of such source, as will be evident to the skilled worker.

Thus, while the compositions employed in the manufacture of the present refractory bodies may consist entirely of zirconia and alumina or of zirconia, alumina and silica, impurities, some of which may function as mineralizers, may be present in minor amounts, say up to about 3% of the total weight of the composition. Furthermore, a small amount of sodium oxide, up to about 3% may also be present, derived from a source, such as sodium carbonate, which may be included in the mixture of raw materials to promote the formation of a glassy minor phase and to minimize mullite formation if desired.

The refractory bodies of the invention present to the naked eye unaided by any magnifying device an apparently essentially homogeneous structure. That is, it is virtually impossible to detect any variation in the amount, size and distribution of various crystalline phases from one area to another of the surface of the body. This apparent macroscopic homogeneity is believed to account for the observed fact that corrosive attack by molten glass is substantially uniform across an exposed refractory surface. Accordingly, these refractory bodies exhibit low stoning tendency, which would not be the case if a substantial variation in the amount, size and distribution of various crystalline phases throughout the body were evident. In other words, lack of apparent macroscopic homogeneity would be equivalent to substantial variation in chemical composition from one point to another on the refractory surface. Obviously, such variation would generally be reflected in differing degrees of corrosive attack from point to point on the surface exposed to molten glass, with resultant high stoning tendency being highly probable.

Microscopically, the major phase of the sintered refractory bodies is monoclinic zirconia or baddeleyite. The minor phase associated therewith depends, of course, on the composition. Thus, those compositions containing no silica produce bodies in which no mullite occurs in the minor phase; the predominate minor phase is alpha alumina. In compositions containing silica the predominate minor phase may consist of a combination of alpha alumina and mullite. Either predominate minor phase may have a glassy phase associated therewith.

The open porosity of the fired bodies is desirably low, being of the order of 2% by volume or less. The closed porosity is also relatively low, being generally less than 10% by volume, with the pore size ordinarily not exceeding the average size of the zirconia crystals, which preferably vary in size from about 10 to about 100 microns

DESCRIPTION OF THE DRAWING

The accompanying drawing indicates both the compositional limits of the sintered refractory bodies of the present invention and the compositional limits of the preferred embodiments. That is, the area defined by lines joining points A, B, C, D, E and F generally represents the compositions contemplated by the invention and the shaded area defined by lines joining points G, H, I and J represents the preferred compositions.

It has been determined that green bodies of compositions lying to the left of line BC and above line CD cannot successfully be fired to an essentially crack-free body of practical size for use in glass contacting applications. It is immediately evident that, (a) in compositions in which the zirconia content is not in excess of 70%, silica is not a necessary component to insure against the development of cracks on firing, (b) that at least 3% of silica must be present in compositions containing the upper limit, 90%, of zirconia and (c) that the minimum silica content in compositions containing from 70 to 90% of zirconia increases in linear fashion with increasing zirconia content. Within this latter range of zirconia content, the minimum silica content in weight percent is essentially equal to the value of the expression 4–A/8 where A is the weight percent of alumina contained in the composition.

It has also been determined that corrosion resistant refractory bodies of acceptably low stoning potential can be made only from green body compositions lying to the left of lines DE and EF and above the line AF of the diagram. It has been determined that the maximum amount of silica permissible (d) in compositions containing from 60 to 75% of zirconia is given by the expression ⅓(50–A) where A is as above defined and (e) must not exceed the weight percent of alumina in those compositions which contain from 75 to 90% of zirconia.

In the immediately preceding two paragraphs, the compositional limits are defined by relating the content of silica and alumina at various levels of zirconia. A somewhat more specific discussion is possible and is included here.

For compositions containing from 60 to 70% of zirconia, fired crack-free refractory bodies may be made therefrom with alumina representing the balance of from 30 to 40%. Silica becomes a necessary component when a zirconia level of about 70% is reached. From this level of zirconia to the maximum value of 90%, the minimum requisite silica content increases in linear fashion from 0 to about 3%; alumina, of course, constitutes the balance of the composition.

To assure the desired resistance to corrosion, the following conditions as to maximum silica content are to be met.

At the maximum value of zirconia content, 90%, no more than about 5% of silica should be present in the compositions. As the zirconia decreases from the maximum value to about 75%, the amount of silica increases in linear fashion to the maximum permitted value of 12.5%. Finally, the silica content decreases from this value to about 5%, again in linear fashion, as the zirconia content drops from 75% to its minimal value of 60%.

It is to be understood that alumina constitutes the balance of the above defined compositions and that the silica, in no case, is present in an amount in excess of the alumina content.

DESCRIPTION OF THE PREFERRED EMBODIMENT

The ultimate utility of a refractory body for use in glass contacting service depends on several considerations, not necessarily interrelated. For example, corrosion can occur essentially uniformly over the surface of the refractory body, the several components thereof dissolving in the molten glass at a relatively uniform rate. Corrosion of this nature, while possibly objectionable from the viewpoint of refractory service life or batch contamination, is not objectionable as giving rise to undue stoning. However, it is possible for at least one component of the refractory body to dissolve much more rapidly than one or more of the other components. Accordingly, while the refractory may have a satisfactory service life, it may exhibit stoning potential to an undesirable extent. Thus, both corrosion rate and stoning potential must be considered in the evaluation of a given refractory composition.

Furthermore, it is known that glass may penetrate some distance into the refractory body beyond the glass-refractory interface. If penetration is excessive, the bonding of the refractory structure is interfered with and excessive stoning may result. Accordingly, the factor of penetration must also be considered in the evaluation of a glass-contacting refractory.

For the purpose of the present invention, an evaluation method has been devised which, in a quantitative manner, involves all of the above-mentioned factors of corrosion, stoning potential and glass penetration. By procedures to be described hereinafter the following were determined: The extent of corrosion of samples of various compositions by molten soda-lime glass, the depth of penetration of the glass into the samples and the stoning potential of the samples. Similar values were determined for reference samples of a widely used fused cast refractory material described in U.S. Pat. 3,079,452 and conforming approximately to the following analysis, by weight: $ZrO_2$, 41.7%; $Al_2O_3$, 45.7%; $SiO_2$, 11.4%; $Na_2O$, 1.0% and trace amounts of $TiO_2$, $Fe_2O_3$ and $B_2O_3$.

For each of these three test procedures a ratio was determined relating a value obtained for samples of each composition to an equivalent test value for samples of the above described fused cast refractory. These ratios are designated $Sc/Rc$, $Sp/Rp$ and $Ss/Rs$ in which S indicates a test value of a given sample of the present invention, R is the equivalent test value for the reference refractory and the subscripts, $c$, $p$ and $s$ designate corrosion, penetration and stoning potential respectively.

Each of the above ratios is unity if the sample being investigated is equal in respect to the characteristic being determined, to the fused cast refractory reference sample; a value less than unity is taken as evidence of superiority over the fused cast material. Corrosion ratings for the experimental compositions were obtained by multiplying the values of the three ratios in each case. Corrosion ratings less than unity were the desiderata and were employed to establish the compositional limits represented by the lines DE, EF and AF of the accompanying drawing. The remaining lines on the triaxial diagram, AB, BC and CD, which complete the definition of the compositions contemplated by the invention, are, of course, expressive of the limits necessary if substantially crack-free refractory bodies are to be obtained on firing.

The above mentioned test procedures were carried out as follows:

Corrosion test

An elongated sample having a square cross section measuring one centimeter on a side was suspended to a depth of about 1.5 centimeters in a molten bath of soda lime glass and maintained therein for three days, the temperature of the glass being about 1500° C. The corrosion cut was measured at the metal line, or the glass melt-air interface, and at half the distance between the metal line and the submerged end of the sample. The average of these two values was determined, this average being taken as a measure of the corrosion resistance of the individual sample.

Glass penetration test

The samples resulting from the above corrosion test were employed. By microscopic examination (40–100 ×) the depth of penetration of the glass was measured on two sides of the sample at the metal line and at a point midway between the metal line and the submerged end of the sample. The average of these four values was determined and taken as a measure of glass penetration.

Stoning potential evaluation

In the above described corrosion test, the molten glass is contained in a platinum crucible. At the conclusion of the test, the refractory sample, to which some glass adheres, is removed and the glass remaining in the crucible is allowed to cool. The cooled glass slug is removed and examined under low power magnification, as is the glass that adheres to the refractory sample. On the basis of these observations, which involves comparing the samples with reference standards, the refractory is assigned a stoning potential value on an arbitrary scale of from 0 to 4, a low value indicating low stoning potential.

Ten samples of the fused cast refractory reference material were subjected to each of the above test procedures. The average value obtained in each case was entered as $Rc$, $Rp$ or $Rs$ in the earlier mentioned ratios.

The soda lime glass employed in the above described corrosion test corresponded to the following analysis, the percentages being given on a weight basis: $SiO_2$, 73.0%; $Na_2O$, 16.65%; $K_2O$, 0.39%; $CaO$, 4.77%; $MgO$, 3.35%; $Al_2O_3$, 1.49% and $Sb_2O_3$, 0.31%.

In a manner subsequently to be generally described, refractory blocks were prepared by sintering green bodies of the compositions set out in Table I below. The raw materials employed in the preparation of the green bodies conformed to the following analysis, weight percent basis: Zirconia source: $ZrO_2$, 99%; $SiO_2$, 0.18%; $CaO$, 0.22%; $MgO$, 0.15%; $Fe_2O_3$, 0.1%; $Al_2O_3$, 0.16%; $TiO_2$, 0.11%; Alumina source: $Al_2O_3$, 99.2%; $SiO_2$, 0.02%; $Fe_2O_3$, 0.03%; $Na_2O$, 0.45%; and Silica source: $SiO_2$, 99.69%, the balance consisting of $B_2O_3$, $Al_2O_3$, $CaO$, $ZrO_2$, $Fe_2O_3$, $TiO_2$, $MgO$, $PbO$, $MnO_2$ and $CuO$.

TABLE I.—EVALUATION OF BLOCKS OF VARIOUS COMPOSITIONS

| No. | Composition wt. percent (in order) $ZrO_2$-$Al_2O_3$-$SiO_2$ | Corrosion average cut, mm. | Glass penetration average, mm. | Stoning potential | Sc/Rc | Sp/Rp | Ss/Rs | Corrosion rating (a) | Condition of block |
|---|---|---|---|---|---|---|---|---|---|
| Reference refractory | (1) | 0.82 | 0.45 | 0.58 | | | | 1 | |
| 1+ | 60-40-0 | 0.53 | 0.315 | 0.8 | 0.64 | 0.70 | 1.38 | 0.62 | ECF. |
| 2+ | 65-35-0 | 0.70 | 0.35 | 0.8 | 0.85 | 0.77 | 1.38 | 0.91 | ECF. |
| 3+ | 75-24-1 | 0.72 | 0.275 | 0.3 | 0.87 | 0.61 | 0.52 | 0.27 | ECF. |
| 4* | 85-15-0 | 0.90 | 0.165 | 0.3 | 1.09 | 0.36 | 0.52 | 0.21 | Badly cracked. |
| 5+ | 85-13-2 | 0.62 | 0.305 | 0.5 | 0.75 | 0.68 | 0.86 | 0.44 | Moderately cracked. |
| 6* | 90-10-0 | | | | | | | | Badly cracked. |
| 7* | 90-8-2 | | | | | | | | Do. |
| 8+ | 90-5-5 | | | | | | | | ECF. |
| 9** | 90-0-10 | | | | | | | | Badly cracked. |
| 10* | 95-5-0 | | | | | | | | Do. |
| 11* | 95-3-2 | | | | | | | | Do. |
| 12** | 85-5-10 | 0.77 | 5.00 | 0.5 | 0.93 | 11.05 | 0.86 | 8.84 | ECF. |
| 13+ | 85-10-5 | 0.87 | 0.50 | 0.4 | 1.05 | 1.11 | 0.69 | 0.80 | ECF. |
| 14+ | 75-22-3 | 0.76 | 0.335 | 0.5 | 0.92 | 0.74 | 0.86 | 0.59 | Moderately cracked. |
| 15+ | 75-20-5 | 0.80 | 0.400 | 0.3 | 0.97 | 0.88 | 0.52 | 0.45 | ECF. |
| 16+ | 75-15-10 | 0.78 | 0.63 | 0.3 | 0.94 | 1.39 | 0.52 | 0.68 | ECF. |
| 17** | 75-10-15 | 1.12 | 5.00 | 1.9 | 1.36 | 11.05 | 3.27 | 49.2 | ECF. |
| 18+ | 65-27.5-7.5 | 0.72 | 0.455 | 0.8 | 0.87 | 1.01 | 1.38 | 1.21 | ECF |
| 19** | 65-20-15 | 0.75 | 0.79 | 0.7 | 0.91 | 1.75 | 1.21 | 1.92 | ECF. |
| 20** | 60-30-10 | 0.92 | 0.495 | 1.2 | 1.11 | 1.09 | 2.07 | 2.50 | ECF. |

1 Average of 10 samples.
+ = composition within area ABCDEF of drawing.
* = composition outside above area left of line BC or above line CD.
** = composition outside above area right of line DEF.
(a) = corrosion rating = Sc/Rc × Sp/Rp × Ss/Rs.
ECF = Essentially crack free.

In Table I, above, the condition of the blocks is set out under the headings, essentially crack free, moderately cracked and badly cracked. By a badly cracked block is meant one in which a fissure or fissures are of sufficient width and depth to render them obviously unfit for installation in a structure wherein they will be in contact with molten glass. A moderately cracked block may exhibit hair-line cracks, that is, fissures that are relatively narrow and shallow and which, as will be evident to the skilled worker, will not unduly affect the usefulness of the block. An essentially crack free block is one that, to the naked eye, exhibits no evidence of cracking.

To be completely satisfactory, a refractory block, of course, must be no more than moderately cracked on the above basis and possess a corrosion rating of near unity or less. It will be evident, from an inspection of the data of Table I, that blocks of compositions falling outside the area defined by the lines connecting points A, B, C, D, E and F of the drawing fail in respect to at least one of these qualifications. Thus, compositions to the left of line BC and above the line CD give fired blocks that are structurally unsound, although they may exhibit a satisfactory corrosion rating. Similarly, blocks of compositions lying to the right of the broken line DEF, while generally structurally sound, do not meet the criterion of one or more of the factors of satisfactory corrosion resistance, low stoning potential and acceptably low penetration by molten glass.

On the other hand, compositions falling within the defined area give rise to sintered refractory bodies which are structurally sound and possess the desired corrosion rating. Furthermore, within this area it is possible to arrive at compositions in which the one desired characteristic is achieved in substantial measure without important sacrifice of the other. Thus, sample No. 15 in Table I, which falls within the preferred range defined by the rhomboidal area GHIJ, is essentially crack free and, in addition, possesses an excellent corrosion rating. However, sample No. 13, which is well removed from the preferred composition range, is also essentially crack free and shows a corrosion rating which, while not as low as that of No. 15, is completely acceptable.

The refractory blocks from which the samples were obtained for the above described comparative evaluation were prepared by the usual, art-recognized methods of forming green bodies, heating the green bodies to sintering temperature, above at least 1500° C., maintaining the bodies at sintering temperature for a time sufficient to achieve maximum practical densification thereof and subsequently cooling the sintered bodies. It is to be noted, however, that, with the compositions of the present invention, the cooling must be carefully controlled to prevent fracturing of the blocks by the cooling-induced inversion of zirconia from the tetragonal to the monoclinic phase.

Specifically, the following precautions must be observed in the cooling of a sintered block. When the furnace has cooled to a temperature of from about 1100° C. to about 1040° C., the block must be maintained within that temperature range for a length of time adequate to permit the block to achieve a temperature within that range substantially uniformly through out its mass. The length of time that the block must be held at this temperature is dependent on its weight and dimensions. However, this time can readily be determined by the skilled worker with a minimum of experimentation.

Thereafter, the block is cooled at a rate not in excess of about 5° C. per hour to a temperature within the range of from about 990° C. to about 940° C., at which temperature it is again held until it has achieved substantial temperature uniformity throughout. It is then cooled at a rate no greater than 5° C. per hour until a temperature no higher than about 900° C. is reached. Thereafter, the cooling rate may be increased to a rate which would be generally recognized in the art as appropriate for large, dense refractory shapes.

As illustrative of the foregoing, the following firing schedule was employed in the preparation of blocks of the compositions set out in Table I.

TABLE II.—FIRING SCHEDULE FOR COMPOSITIONS OF TABLE I

| Temperature | Rate, °C./hr. | Hold time, hrs. |
|---|---|---|
| R.T. to 1,100 | 50 | |
| 1,100 to 1,650 | 15 | |
| Sinter at 1,650 | | 24 |
| 1,650 to 1,050 | 6 | |
| Hold at 1,050 | | 30 |
| 1,050 to 970 | 3 | |
| Hold at 970 | | 50 |
| 970 to 800 | 3 | |
| 800 to RT | 11 | |

The second holding period from 990° C. to 940° C. may be omitted if it is possible to control the cooling rate to a value of no more than 4° C. per hour, preferably about 2° C. per hour. In such case, when a block has cooled to about 1000° C., the rate of cooling is adjusted to 4° C. per hour or less and is maintained at this value until the block has cooled to about 900° C.

In the preparation of batches of the compositions to be formed into the refractory bodies of the invention, it is advantageous, although not necessary, to comminute all of the batch components to a degree that substantially all (i.e., at least about 99% by weight) particles will pass through a 150 micron opening (i.e., 100 mesh U.S. Standard Sieve Series). Comminution of the batch components to this degree of fineness is, of course, of aid in attaining the greatest degree of macroscopic structural uniformity. Furthermore, it permits the body to sinter to a dense structure with desirably low, less than 2%, open porosity. Nevertheless, a completely satisfactory body may be fabricated from somewhat coarser raw materials.

Mixtures of the finely comminuted raw materials and the relatively coarser materials may also be successfully employed. Advantageously, up to about 25% by weight of the mixture may be pre-reacted material of the final composition having particles in the range of 14 to 100 mesh, U.S. Standard Sieve Series.

As will be understood, the several components of the batch may be comminuted separately and thereafter be intimately mixed or they may be mixed before comminution.

Molding of the batch mixtures into green bodies of desired shape can be accomplished by any appropriate technique, e.g., slip casting, dry pressing, isostatic pressing, extrusion and the like. A particularly preferred method and that employed in making blocks of compositions set forth in Table I, is slip casting in which a dilute solution of ordinary commercial fish oil in toluene is employed as the fluid medium. Specifically, a solution containing about 7% by weight of fish oil is employed. Generally, the toluene-fish oil medium will constitute about 10% by weight of its mixture with the comminuted raw materials. The fired densities of products obtained from green bodies slip cast from this system are found to be desirably somewhat higher than those of products obtained from green bodies slip cast from aqueous systems and their apparent porosities are lower.

We claim:

1. A sintered ceramic refractory body characterized by being substantially crack-free, dense and highly resistant to corrosion by molten glass at high use temperatures of at least about 1500° C., and exhibiting low stoning potential, said body having a crystalline structure of macroscopic homogeneity with the major phase being monoclinic zirconia crystals of sizes in the range of from about 10 to about 100 microns and consisting essentially of, by weight, from about 60 to about 90% $ZrO_2$ and from about 10 to about 40% of a sum of $Al_2O_3$ and $SiO_2$, the minimum content of $SiO_2$ being (a) 0% when the $ZrO_2$ content is not in excess of 70% and
   (b) represented by the expression $4-A/8$, where A is the content of $Al_2O_3$, when the $ZrO_2$ content is from 70 to 90%, the maximum content of $SiO_2$ being (c) represented by the expression $\frac{1}{3}(50-A)$, where A is as above defined, when the $ZrO_2$ content is from 60 to 75% and
   (d) not in excess of the $Al_2O_3$ content when the $ZrO_2$ content is from 75 to 90%.

2. The sintered ceramic refractory body of claim 1 in which the sum of the weight percentages of $ZrO_2$, $Al_2O_3$ and $SiO_2$ constitutes at least about 94% of the total weight of the body.

3. The sintered ceramic refractory body of claim 1 characterized by essentially uniform macroscopic structure and having microscopically monoclinic zirconia as the major phase and a minor phase which is a member of the group consisting of (a) alpha alumina, (b) alpha alumina and mullite, (c) alpha alumina and a glassy phase and (d) alpha alumina, mullite and a glassy phase.

4. The sintered cermic refractory body of claim 1 consisting essentially of by weight from about 70 to about 80% $ZrO_2$, from about 15 to 28% $Al_2O_3$ and from about 2 to about 5% $SiO_2$.

5. The sintered ceramic refractory body of claim 1 having not more than 2% by volume open porosity and less than 10% by volume closed porosity.

References Cited

FOREIGN PATENTS 150   1/1963   Japan.

JAMES E. POER, Primary Examiner

U.S. Cl. X.R.

106—65